Figure 1:
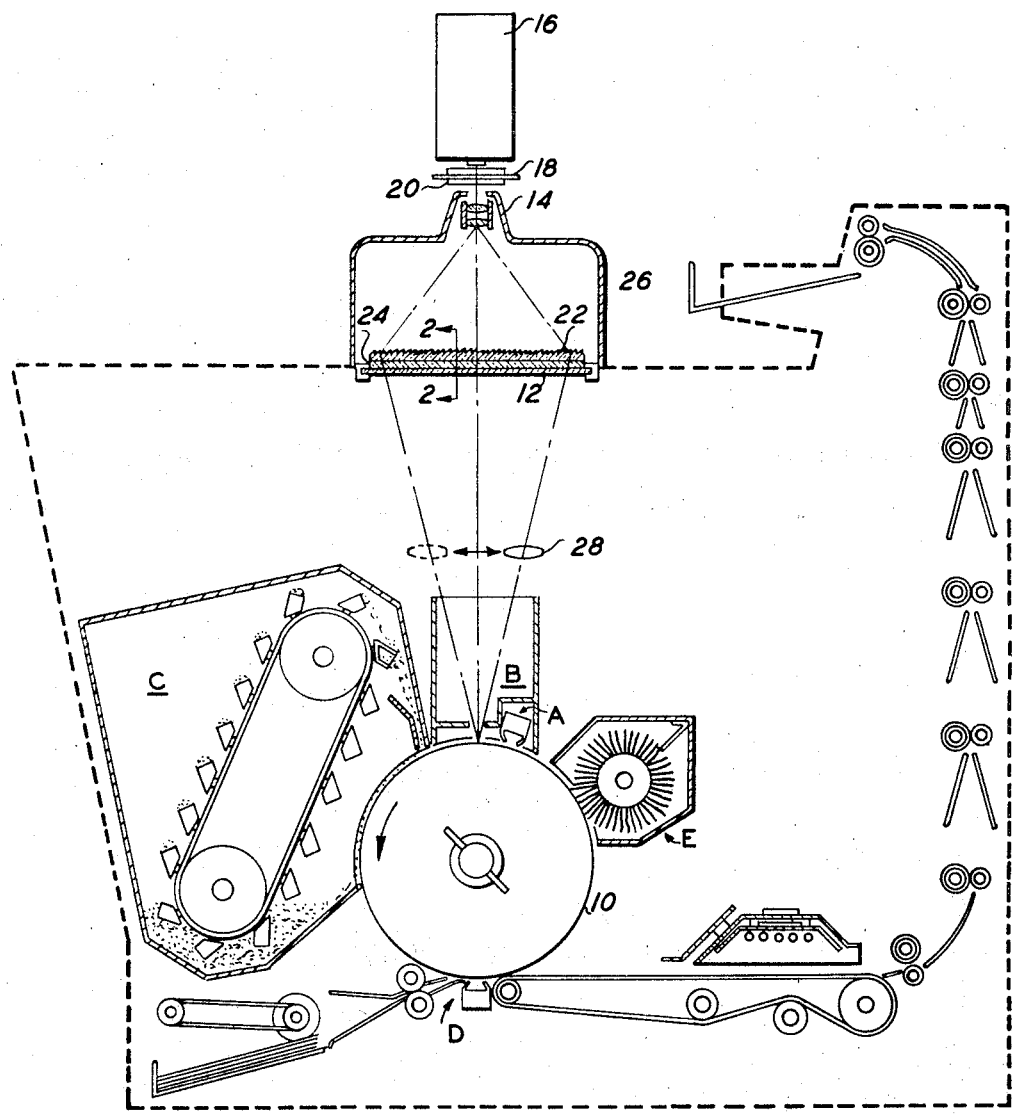

INVENTORS.
JOHN E. BLACKERT
HARVEY S. TOWERS
BY
ATTORNEYS

United States Patent Office 3,424,525
Patented Jan. 28, 1969

---

3,424,525
MICROFILM COPIER ATTACHMENT
Harvey S. Towers and John E. Blackert, Webster, N.Y., assignors to Xerox Corporation, Rochester, N.Y., a corporation of New York
Filed May 20, 1966, Ser. No. 551,584
U.S. Cl. 355—3  3 Claims
Int. Cl. G03b 21/00, 27/32

This invention relates to microfilm enlarging and copying and to improved apparatus for reproducing from microfilm originals. More specifically, the invention relates to an improved apparatus for causing microfilm to be reproduced on conventional "office copier" machines through a stationary Fresnel lens positioned for the highest resolution on the image copy.

For the purpose of this disclosure, an "office copier" refers to that type of copying apparatus having a platen capable of holding a document or accommodating three dimensional objects and using any process to make copies from original documents. Xerography is that process which employs a photoconductive insulating medium and radiation to form latent electrostatic images.

Since the disclosure of the basic concept of xerography in Carlson Patent No. 2,297,691, issued Oct. 6, 1942, a variety of machines and devices have been proposed to incorporate such teachings in a manner to form copy xerographically on a commercial basis. For the most part, each of such devices has been specifically designed to the solution of a particular reproduction problem, and for the most part, has been limited to the particular use intended. Thus, for example, machines are presently in wide commercial use for the continuous high-speed enlargement and copying of microfilm in roll form, and for reproducing from opaque originals.

One of the most commercially successful xerographic machines is that disclosed in Mayo Patent No. 3,062,109, issued on Nov. 6, 1962. This machine is used for reproducing from opaque originals which are placed on a platen positioned on its desk-like top. As useful as this machine is, as evidenced by its commercial acceptance, it cannot be used to reproduce xerographic copies from microfilm even though many establishments using this machine have occasion to produce hard enlarged copies from their microfilm files. The major problem in the development of an attachment for this type machine, which will enable copying from microfilm originals, is the production of a suitable image in the plane of the platen of the electrostatic reproducing machine with an adequate quantity of usable uniform illumination to enable the existing system to produce an acceptable copy.

The present invention is adopted for use as an attachment to a conventional "office copier" machine originally designed to produce copies from opaque originals. If the machine contains a platen capable of accommodating three dimensional objects, it can be equipped with an attachment incorporating this invention whereby the "office copier" will be able to produce enlarged copies from microfilm originals. This invention would allow portability of a microfilm input attachment while allowing the "office copier" machine to produce enlarged copies of high contrast and resolution of the micro-data found on the microfilm original. The microfilm input may be in roll form or single frame mounted in data processing cards and the image thereon may be positive or negative with opaque data and transparent background or with transparent data and opaque background.

Of course, there are machines for producing enlarged copies from microfilm input; however, these machines are not portable or capable of attachment to other existing "office copiers." Although many of these machines make excellent copies and have been commercially successful, they all image on their photosensitive surface by a direct scan of the microfilm image, that is, they cause the microfilm to traverse the optical axis of the lens system of the "office copier" machine in a carefully timed relation to the movement of the photosensitive surface used to form the image or enlarged copy. This necessitates complicated equipment, automatic devices, programming means and elaborate timing equipment for synchronizing the relative movement of the microfilm original scanning device and the photosensitive surface upon which the image is to be formed. Such a device may be seen, for example, in Hunt Patent No. 3,078,770, issued Feb. 6, 1963, and Rutkus Patent No. 3,137,202, issued June 16, 1964. This invention eliminates movement of the film relative to a fixed optical axis.

Other machines have been developed which also eliminates movement of the film relative to a fixed optical axis. Among the known devices are systems for reproducing hard copies from microfilm input through a Fresnel lens. The problems which have been encountered with this manner of enlarging and copying is that the "office copier" apparatus utilized will not only copy the micro-data image but also the gratings of the Fresnel lens if the lens is placed at the object plane of the apparatus. Elimination of these lines was heretofore accomplished by either removing the Fresnel lens from the object plane of the "copier" system i.e., moving it out of focus to the reproduction system by raising it out of the focal plane; or by oscillating the Fresnel lens approximately within this plane such that those portions of the photosensitive surface where the gratings or lines of the Fresnel lens were projected may receive light rays or be exposed as the groove shadows are moved away. The difficulty with the first method of removing the lens from the focal plane was that it degrades the image formed on the photosensitive surface. Although there is sufficient imaging on the photosensitive surface to permit reproduction, the resolution is inadequate for commercial reproduction requirements. The second system involves an oscillating lens which requires complicated equipment including a special housing adapted to movably maintain the Fresnel lens and a motor means with linkage to cause the oscillation of the lens.

It is therefore an object of this invention to improve reproduction apparatus for micro-data image enlarging and copying.

Another object of this invention is to improve portable apparatus for use with existing reproduction machines for reproducing microfilm onto sheets of support material with commercially satisfactory resolution and contrast.

A further object is to improve reproduction of a commercially acceptable copy of a full frame of microfilm with no movement of the film relative to a fixed optical axis.

Another object of this invention is to employ inexpensive and easily fabricated optical equipment to electrostatically enlarge and reproduce with high, commercially satisfactory resolution and contrast from microfilm originals.

Another object is to improve reproduction of enlarged micro-data through a Fresnel lens without reproducing the gratings therein, and without movement of the Fresnel lens.

These and other objects of the invention are attained by means of an apparatus for projecting micro-data image rays for visual viewing onto a light receiving means comprising a stationary, fine grooved, Fresnel lens at the object plane of an "office copier" apparatus in order to make copies of the original microfilm projected thereon.

Figure 2:
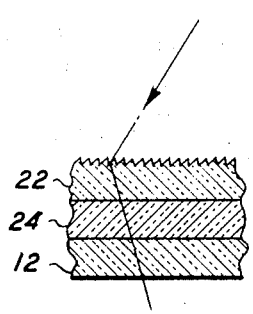

For a better understanding of the invention, as well as other objects and further features thereof, reference is had to the following detailed description of the invention to be read in conjunction with the accompanying drawings wherein:

FIG. 1 illustrates schematically an embodiment of a microfilm attachment employing this invention for projecting viewable images on the platen on an electrostatic copying machine in conjunction with an embodiment of the xerographic apparatus adapted for continuous and automatic operation and incorporating an optical scanning mechanism; and FIG. 2 is a sectional view of the copier object plane and platen taken along line 2—2 in FIG. 1.

Referring now to the drawings wherein like numerals designate like elements, there is shown schematically in FIG. 1 a microfilm enlarging and imaging apparatus in combination with a conventional xerographic apparatus operable as an automatic machine.

The xerographic apparatus comprises a xerographic plate including a photoconductive layer on a conductive backing and formed in the shape of a drum, generally designated by the numeral 10. The drum is mounted on a shaft journaled on a suitable frame of the machine to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station, preferably located as indicated by reference character A, at which a uniform electrostatic charge is deposited on the photoconductive layer of the xerographic drum.

Next subsequent thereto in the path of motion of the xerographic drum is exposure station B at which a light or radiation pattern of copy to be reproduced is projected onto the drum surface to dissipate the drum charge in the exposed areas thereof. Thereby, a latent electrostatic image of copy to be reproduced is formed.

Adjacent to the exposure station is a developing station C whereat the latent electrostatic image is developing by cascading a xerographic powder over the drum. Positioned next adjacent to the developing station is the image transfer station D at which the xerographic powder image is electrostatically transferred from the drum surface to a transfer material or support surface.

The final station E is a drum cleaning and discharge station at which the drum surface is brushed to remove residual xerographic powder particles remaining after image transfer, and at which the drum surface is exposed to a relatively bright light source to effect substantially complete discharge of any residual electrostatic charge remaining thereon.

For a more complete and detailed description of the automatic xerographic apparatus, see Mayo et al. Patent No. 3,062,109, issued Nov. 6, 1962.

At the exposure station B, and more specifically relating to the improvement in microfilm imaging for electrostatic reproduction, is the microfilm enlarging and imaging apparatus necessary to form a reproducible image on the drum 10 from a platen 12. This is accomplished by means of a projection system adapted to converge the light rays diverging from an enlarging objective lens 14 to form an enlarged and uniformly illuminated image at its focal plane with the rays of light converging therefrom. The light image for this system is developed from a projector light source 16, a frame of microfilm 18 held in a film gate 20 situated such that the image passes through objective lens 14 to be enlarged thereby. The resulting image light rays are projected upon a micro-data image receiving member composed of a fine grooved Fresnel lens 22 to be imaged thereon or on a light dispersing material or translucent 24, which can be, for example, frosted glass, etc., placed approximately at the image focal plane of the objective lens 14 and on the platen 12.

The Fresnel lens has the general characteristics of being composites of small, recurring, light deflecting elements that will, as an entire unit, perform to achieve a distribution of light over a predetermined area, in this case, the distance of scan of scan lens 28. The gratings or grooves of the lens must be more than 150 per inch to function within the xerographic system without the need for oscillation. Neither the material of which the lens is composed nor the method of manufacture is important for the invention herein.

The light dispersing material and Fresnel lens may be interchanged in their position on the platen such that either may be above the other. The object plane of the "office copier" reproduction system and the image plane of the microfilm projection system are approximately the same and are located immediately above the platen 12. The image formed at the plane is protected from extraneous light by a container 26.

The container 26 further serves as the housing for the portable microfilm enlarging and imaging apparatus. It is adapted to position the Fresnel lens and the translucent material above the platen 12 while further housing the entire projection system for enlarging and imaging the microfilm. Thus, the entire microfilm projection apparatus is portable and may be easily attached to or detached from an existing "office copier" machine.

The system, therefore, directs an enlarged image of micro-data obtained from the microfilm original to a translucent material approximately on the platen of the "office copier" through a Fresnel lens in touching contact with the translucent. The Fresnel lens insures the converging of the light rays at the exposure station of the "copier" such that they substantially are directed to pass within the scan of the scan lens 28. Lens 28 may then scan the image at its object focal plane as an object and directing the image light rays therefrom to the photosensitive surface of the "copier" machine to produce an electrostatic latent image thereon.

The major problem in devices of this type is the removal of the groove lines of the Fresnel lens from the copy sheet reproduced by the "office copier" machine. Previous theories used to devise structural devices for elimination of these lines on the final copies were the "focus" theory and the "film speed" theory. In the former, the Fresnel lens is removed from the object focal plane of the office copier system thereby blurring the lines of the lens making them unreproducible to the system. Of course, the entire object is also out of general focus to the "office copier" apparatus since the image rays striking the images at the copier object plane are not at the focal plane of any of the lenses of the system. Therefore, a less than satisfactory copy of the original input is reproduced. To correct the poor resolution caused by removing the Fresnel lens from the focal plane of the "copier" apparatus, the second theory referred to above was promulgated.

Here the Fresnel lens is maintained at the focal plane of the "copier" apparatus and the elimination of the groove lines from the copy is accomplished by oscillating the Fresnel lens approximately within the object plane of the "copier" apparatus whereby those portions of the photosensitive surface, where the gratings or lines of the Fresnel lens were projected, receive light rays and are exposed. The rate of oscillations is related to the "film speed" or photosensitivity of the image bearing surface of the "copier" apparatus. In an object scanning type "copier" the exposure of the photosensitive surface on the areas which would remain unexposed because of the grooves of the Fresnel lens is determined by the relation between the rate of oscillation and the speed of the scanning lens. As long as the oscillations of the Fresnel lens allow light normally blocked by a Fresnel lens groove to traverse the Fresnel lens plane for a period of time sufficient to substantially effect the photosensitive material, that portion of the photosensitive surface previously blocked from, but now struck by, light rays will be exposed, thus eliminating the image of the groove line from the copy.

This latter theory necessitates complicated equipment to both oscillate the Fresnel lens and maintain it in the object plane of the "copier." Consequently, it increases the costs and expense of a modular unit for an "office copier" originally designed for reproducing document type objects to further enable it to reproduce from microfilm input. The theory used by us is based on resolution capabilities of the "office copier" system and allows us to eliminate the grooves of the Fresnel lens from the copy made by the "copier" machine without removing the Fresnel lens from the focal plane of the machine and without necessitating any complicated or expensive equipment. Hence, we have superior resolution without additional costs or complications due to extra equipment. Basically we obtain the same resolution qualities as an oscillating Fresnel lens system while eliminating the need for oscillations and equipment therefor.

The resolution capabilities of popular xerographic photoconductive insulators is not exceptionally high. There is, of course, no need for ultrasensitive resolution in an office copier type apparatus since the vast majority of work done by such an apparatus does not call for fine detail copying.

The resolution of a commercially xerographic machine using a photoconductive insulating surface varies between 5 and 12 lines per millimeter. Therefore, if we presented to such a machine an image with more than 12 lines per millimeter, the machine would not be able to resolve or "see" it. What this means in a xerographic system is that the lines are so closely spaced that the charge differential they present on the photoconductive insulator surface is imperceptible. Therefore, charged developer material placed on the surface will not cling thereto because of the lack of differential necessary to attract the charged developer particles. In the "office copier" machine, actual resolution is inferior to the resolution capabilities of its photosensitive surface. There are several reasons for this, for example: the size of the charged developer particle is too large to be able to get close enough to the photoconductive surface to distinguish between the charged and uncharged areas thereon; furthermore, the optical system itself tends to decrease resolution because of aberrations in the lens system and light scattering between the image lines.

As an example of the use of a lens in a xerographic "office copier" apparatus of the type disclosed in Mayo Patent No. 3,062,109, referred to above, if one employs a 200 groove per inch Fresnel lens in the system shown schematically in FIG. 1 he would be able to obtain copies without reproduction of the grooves of the Fresnel lens on the copy sheets of the xerographic "office copier," provided the apparatus used had a resolution capability of approximately 7 line pairs per millimeter. This means that the "copier" could distinguish lines of an object that were at least 0.1423 millimeter apart. The apparatus, therefore, would be unable to "see" the lines of the Fresnel lens placed on its platen, even though the lens was at its object focal plane since the lines are merely 0.1274 millimeter apart.

From this example and the theory relating thereto, it is seen that a Fresnel lens can be used at the object focal plane of the optical system of an "office copier" apparatus originally equipped with a platen for copying original documents and other objects enabling such apparatus to copy enlarged micro-data imaged at its object plane.

The Fresnel lens and translucent material are placed approximately at the object plane of the "office copier" optical system without degrading the image by reproducing the groove lines of the Fresnel lens. This occurs only if the groove lines of the Fresnel lens are spaced such that there are more lines per millimeter than can be resolved by the entire optical and reproduction system of the "office copier."

The final resolution of the xerographic "office copier" machine is, to an extent, related to the photoconductive insulating surface employed in the copying process. A machine using selenium and developed by a two-component dry developer as disclosed in Wise Patent No. 2,618,552, issued Nov. 18, 1952, under normal commercial operating conditions would yield a resolution of between 5 and 9 line pairs per millimeter which is, of course, more than sufficient for the uses intended for such a machine. If we had a Fresnel lens containing approximately between 130 and 230 grooves per inch, depending on the resolution of the individual system, placed at the object focal plane of such a machine, the grooves of the Fresnel lens would not be reproduced. Hence, such a lens may be positioned into the system described above for copying from micro-data input in an "office copier" without a reproduction of the groove lines of the Fresnel lens. Other "office copier" machines of a xerographic nature using a zinc oxide treated material as a photoconductive insulating surface have achieved a resolution of 12 line pairs per millimeter under optimum operating conditions. This is the best resolution achievable by an electrostatic "office copier" machine with a platen that is available today. Consequently, a microfilm enlarging and imaging apparatus of the type described hereinabove can be used with such a machine to enable it to copy from micro-data originals if the Fresnel lens placed at the object focal plane of such a machine contains approximately 310 grooves per inch.

The light rays delivered from objective lens 14 of the microfilm projection system all strike the Fresnel lens passing therethrough and bending to converge and fall substantially within the scan of lens 28 of the "office copier" apparatus. The resulting image striking the photosensitive member of the "office copier" is of exceptionally good quality and resolution, being far superior to any known system for enlarging and copying microfilm image data with a microfilm original held in a stationary gate. The superior quality image being achieved without the necessity of equipment to oscillate or move the Fresnel lens.

While the invention has been described with reference to the structures disclosed herein, it is not confined to the details set forth; although the examples and description emphasis is on xerographic machines, its use with other processes or copying is to be realized; and this application is intended to cover such modifications or changes as may come within the purpose of the improvements of the scope of the following claims.

What is claimed is:

1. A system for reproducing micro-data from microfilm, such system having a photosensitive surface adapted for receiving image rays of the micro-data and a processing system for reproducing copies therefrom, comprising:
   a first projection system,
   a light receiving member having a Fresnel lens in the image focal plane of said first projection system,
   a second projection system adapted to direct the image on said light receiving member simultaneously, as the same is produced onto a photosensitive surface and thereby effect the reproduction of the copies of the enlarged micro-data images by the processing system thereof,
   said light receiving member being located at the object plane of said second projection system,
   said Fresnel lens of said light receiving member having a number of grooves per inch at least equal to the resolution capabilities of the photosensitive surface whereby the grooves of said lens are not imaged thereon.

2. The apparatus of claim 1, wherein the photosensitive surface is comprised of a photoconductive insulating medium and the number of grooves per inch of said Fresnel lens is at least 310.

3. The apparatus of claim 2, wherein the photoconductive insulating medium is selenium and the number of grooves per inch in said Fresnel lens is at least 130.

References Cited

UNITED STATES PATENTS

| | | | |
|---|---|---|---|
| 1,960,011 | 5/1934 | Ives | 88—24 |
| 3,176,578 | 4/1965 | Bolsey | 88—24 |

FOREIGN PATENTS 1,364,341  7/1964  France.

NORTON ANSHER, *Primary Examiner.*

W. A. SIVERTSON, *Assistant Examiner.*

U.S. Cl. X.R.

355—48

UNITED STATES PATENT OFFICE
CERTIFICATE OF CORRECTION

Patent No. 3,424,525                                        January 28, 1969

Harvey S. Towers et al.

It is certified that error appears in the above identified patent and that said Letters Patent are hereby corrected as shown below:

Column 1, line 62, and column 6, lines 55 and 57, "micro-data", each occurrence, should read -- micro-size data --. Column 2, lines 24, 46, 63, and 67, column 3, lines 72 and 73, Column 4, line 31, and column 6, lines 20 and 21, 31, 57, and 67, "micro-data", each occurrence, should read -- micro-size --. Column 5, line 72, "micro-data" should read -- micro-sized --. Column 7, after line 7, insert new claim 4:

4. The apparatus of claim 1 wherein said light receiving member further includes a translucent material.

In the heading to the printed specification, line 7, "3 Claims" should read -- 4 Claims --.

Signed and sealed this 24th day of March 1970.

(SEAL)
Attest:

EDWARD M. FLETCHER, JR.                          WILLIAM E. SCHUYLER, JR.
Attesting Officer                                            Commissioner of Patents